No. 12,179. REISSUED DEC. 8, 1903.
M. WADDELL.
MEANS FOR CONTROLLING ELECTRIC MOTORS.
APPLICATION FILED MAR. 10, 1902.
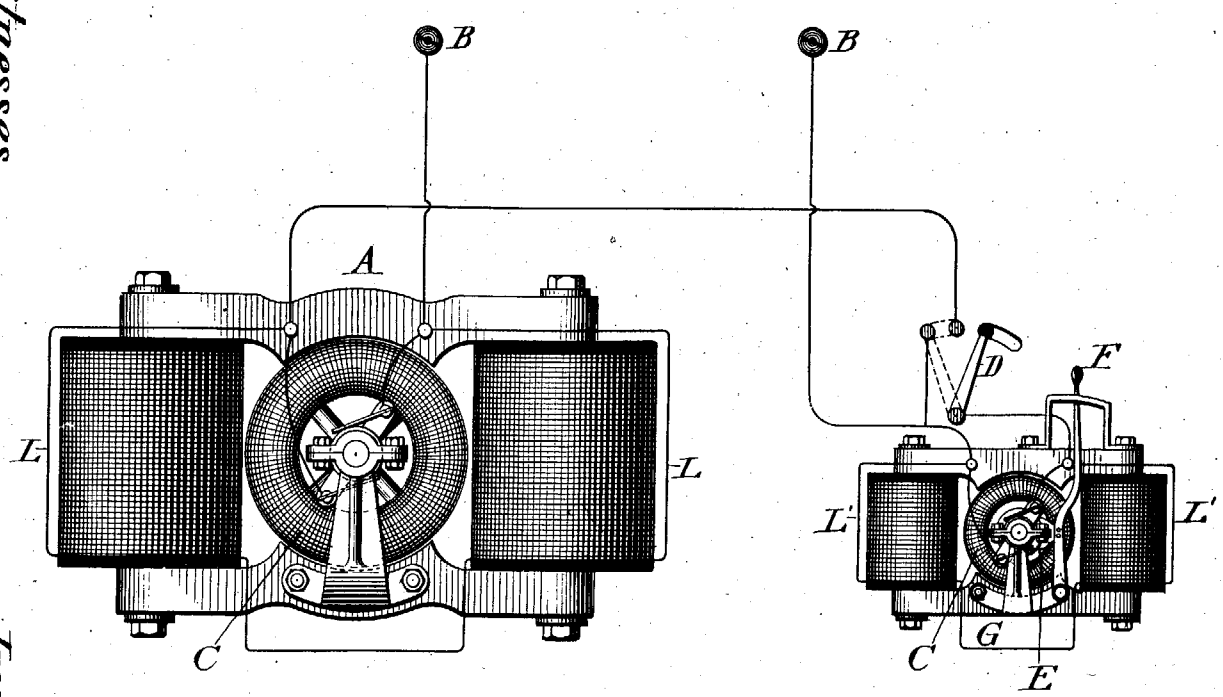
Witnesses:
John C. Lemmie
Chas. J. O'Neill
Inventor:
Montgomery Waddell
by Albert G. Davis
His Attorney No. 12,179. Reissued December 8, 1903.

UNITED STATES PATENT OFFICE.

MONTGOMERY WADDELL, OF NEW YORK, N. Y., ASSIGNOR, BY DIRECT AND MESNE ASSIGNMENTS, TO THE GENERAL ELECTRIC COMPANY, A CORPORATION OF NEW YORK.

MEANS FOR CONTROLLING ELECTRIC MOTORS.

SPECIFICATION forming part of Reissued Letters Patent No. 12,179, dated December 8, 1903.

Original No. 666,121, dated January 15, 1901. Application for reissue filed March 10, 1902. Serial No. 97,657.

*To all whom it may concern:*

Be it known that I, MONTGOMERY WADDELL, a British subject, residing at New York, in the county of New York and State of New York, have invented certain new and useful Improvements in Means for Controlling Electric Motors; and I do hereby declare the following to be a full, clear, and exact description of the invention, such as will enable others skilled in the art to which it appertains to make and use the same.

My invention relates to certain new and useful improvements in means for controlling electric motors, the disposition of parts chosen being such that the motor when loaded may be readily actuated from the electrical source of power, or when in operation may be instantly or gradually stopped or its speed of rotation diminished without the application of mechanical braking devices.

It is well known that an electric motor when loaded cannot readily be operated from the actuating-dynamo to run on constant potential owing to the motor forming a dead short circuit until it obtains its speed and maintains an equal potential to that of the feeding-conductors. To obviate this difficulty, it has heretofore been customary to interpose resistances in series with the electric source of power and the motor and then gradually reduce the resistances to nothing, by which time the motor would have received its full speed and would have acquired the same potential as that of the conductors.

The purpose of my invention is to substitute in series for the resistances referred to a second motor of smaller size, which motor having a comparatively inappreciable load to carry will at once attain its full speed and full potential. The speed of the small motor is then diminished by mechanical means or otherwise, thereby lowering its counter electromotive force and permitting a current to flow through it and through the large motor, the latter beginning to operate when this current reaches a certain point. The speed of the small motor being still further decreased, the potential of the large one will increase until, when the small motor is stopped, the large one is running on full potential, whereupon the small motor may be cut out of the circuit.

By means of my proposed arrangement I am also enabled to stop the large motor without the application of brakes thereto, the interruption of the motion being effected either gradually or instantly, as desired.

In the accompanying drawing, illustrative of my invention, I have shown the same as applied to an ordinary type of motor A, provided with the field-coils L and armature C. B indicates the terminals of a dynamo-electric machine or its equivalent of any convenient construction, and interposed in series between the dynamo-electric machine B and the motor A is a small motor G, provided with a cut-out switch D and the brake E, operated by the brake-lever F.

In starting up the motor A the small motor G is introduced in series by means of the switch D. It immediately attains its full speed and total electromotive force from the source of power. The brake-lever F is thereupon applied, reducing the speed of motor G, thereby causing its counter electromotive force to drop and permitting a current to flow through it and through the large motor A. The application of the brake is continued and the speed of the small motor further diminished until a sufficient current passes through the large motor A to start it in operation. The speed of the small motor being still further decreased, the speed of the large one will increase proportionately, and the potential of the same will rise in proportion as that of G drops until when G is brought to a full stop the large motor A is running on full potential. The small motor G may then be cut out of circuit by throwing the switch into the position shown in the dotted lines in the drawing.

It is evident that the switch and the means for controlling the speed of the small motor G may constitute one and the same device, so as to be operated by a single manipulation. The motors may be shunt-wound or may be wound in series, according to the purpose for which they are to be employed. It is preferable, however, to have shunt-fields for the small motor G, as they can then be on before the main switch is closed.

While I have shown the secondary motor as entirely independent of mechanical connection with the primary motor, it is evident that the two may be built in together upon the same frame and framework without departing from the spirit of my invention.

Having thus described my invention, what I claim, and desire to secure by Letters Patent, is—

1. A controlling device for electric motors, consisting of a secondary motor in series therewith and means for lessening the speed of said secondary motor, substantially as described.

2. A controlling device for an electric motor, consisting of a secondary motor whose armature is in series with the armature of the motor to be regulated, and means for lessening the counter electromotive force of said secondary motor, substantially as described.

3. A controlling device for an electric motor consisting of a secondary motor whose armature is in series with the armature of the motor to be regulated, means for lessening the counter electromotive force of said secondary motor, and a cut-out switch for the secondary motor, substantially as described.

4. The combination with an electric motor of a counter-electromotive-force regulator consisting of a second dynamo-electric machine whose armature is in series with the armature of the motor to be regulated, and independent means for varying the counter electromotive force of the said second dynamo-electric machine, substantially as described.

5. The combination with an electric motor, of a controlling device therefor consisting of a secondary motor having a comparatively inappreciable load, the field-magnets of the two motors being connected up in series, substantially as described.

6. The combination with an electric motor, of a controlling device therefor consisting of a secondary motor having a comparatively inappreciable load, the field-magnets of the two motors being connected up in series, and means for lessening the speed of said secondary motor; substantially as described.

7. The combination with an electric motor, of a controlling device therefor consisting of a secondary motor having a comparatively inappreciable load, the field-magnets of the two motors being connected up in series, and a cut-out switch for the secondary motor; substantially as described.

8. A controlling device for electric motors, consisting of a secondary motor in series therewith, the coils of said secondary motor being shunt-wound, a cut-out switch, and means for lessening the counter electromotive force of the secondary motor, substantially as described.

9. A controlling device for electric motors, consisting of a secondary motor in series therewith, means for lessening the speed of rotation of said secondary motor, and a cut-out switch for said secondary motor, substantially as described.

10. The combination of an electric motor, and a secondary regulating-motor in series therewith, the said secondary motor having its coils shunt-wound, and a cut-out switch and means for lessening the speed of rotation of the secondary motor, substantially as described.

11. The combination of a translating device, a source of supply for said translating device, and a regulating device producing by magnetic induction an electromotive force between the source and the translating device and whose electromotive force is variable, substantially as set forth.

12. The combination of a translating device, a source of supply for said translating device, a dynamo-electric machine located between the source and the translating device and whose electromotive force is variable, and means for varying the electromotive force of said dynamo to regulate said translating device, substantially as set forth.

13. The combination with a source of supply and a circuit extending therefrom, of an electric motor, and a regulating dynamo-electric machine connected in series with said motor across said circuit, said dynamo being adapted to produce an electromotive force variable independently of the electromotive force of said circuit, substantially as set forth.

MONTGOMERY WADDELL.

Witnesses:

MARVIN OLLENDORFF,
H. MURRAY LAMONT.